Feb. 24, 1970 V. M. MOGILEVSKY 3,497,800
VIBRATION MAGNETOMETER FOR MEASURING TANGENTIAL COMPONENT
OF CONSTANT MAGNETIC FIELD ON FLAT SURFACE OF
SAMPLES OF FERROMAGNETIC MATERIALS
Filed April 29, 1966

United States Patent Office 3,497,800
Patented Feb. 24, 1970

3,497,800
VIBRATION MAGNETOMETER FOR MEASURING TANGENTIAL COMPONENT OF CONSTANT MAGNETIC FIELD ON FLAT SURFACE OF SAMPLES OF FERROMAGNETIC MATERIALS
Vitaly Moritsovich Mogilevsky, Ul. Gogolya 49, kv. 39, Novosibirsk, U.S.S.R.
Filed Apr. 29, 1966, Ser. No. 546,307
Int. Cl. G01r 33/02
U.S. Cl. 324—47                             7 Claims

ABSTRACT OF THE DISCLOSURE

A vibration magnetometer for measuring the tangential component of a magnetic field on the flat surface of samples of ferromagnetic materials. Measurements are effected by means of a measuring coil composed of two sections, said sections measuring the tangential component of the field at points disposed at fixed distances from the sample surface. The measuring circuit of the apparatus is provided with an operational amplifier that automatically calculates the field intensity on the sample surface by the results of measurements at said points. The measuring coil is caused to perform oscillatory motion by a vibro-drive in the form of a tuning fork oscillator with an amplifier employing cathode followers with a step-up transformer used as an interstage connection element.

---

This invention relates to devices for measuring magnetic values and particularly to devices for measuring the tangential component of magnetic field intensity on the surface of ferromagnetic materials with the help of a vibrating measuring coil.

In known magnetometers, a vibrating measuring coil is given a sinusoidal oscillatory motion of constant amplitude and frequency from a vibro-drive operating on the principle of a reverse piezoelectric effect.

In such devices, the measuring coil is connected to a piezoelectric crystal vibrating at a frequency of the electric field applied to it, said frequency being equal to the frequency of the crystal's natural mechanical resonance.

A disadvantage of magnetometers provided with the piezoelectric vibro-drive is their low temperature stability, which causes a measurement error directly proportional to frequency change. Elimination of this error is achieved by calibrating the magnetometer in a certain magnetic field before each measurement or by using compensating circuits, which involves complication of design and high costs of the instruments.

Another disadvantage of such magnetometers is that strict requirements are necesary for the piezo-crystal oscillator, particularly with regard to the stability of its frequency and amplitude and the non-susceptibility to the aging effect of electronic tubes. To meet these requirements means to complicate the design and to increase the cost of the electronic part of the instruments, and to decrease their resistance to vibration.

A disadvantage of the piezoelectric vibro-drive is a considerable variation of piezo-crystal parameters from sample to sample.

An object of the present invention is to eliminate said disadvantages.

Another object of this invention is to provide a magnetometer with a vibro-drive of simple design.

Still another object of the present invention is to provide a magnetometer with a vibro-drive of high amplitude and frequency stability.

In the accomplishment of the above and other objects of the present invention a tuning-fork oscillator is used as a source of mechanical vibrations of the measuring coil, the tuning-fork of said oscillator being made of a temperature-compensated material and imparting to the measuring coil oscillations of constant amplitude and frequency. Undamped oscillations of the tuning-fork are maintained by an amplifier in the positive feedback circuit, said amplifier being made preferably of cathode followers with common-plate circuit, with a step-up transformer being used for inter-stage coupling, owing to which not only power-amplification but also voltage-amplification is achieved, as well as high stability of transmission factor as a consequence of the hundred-percent negative feedback in cathode followers.

Figure 1:
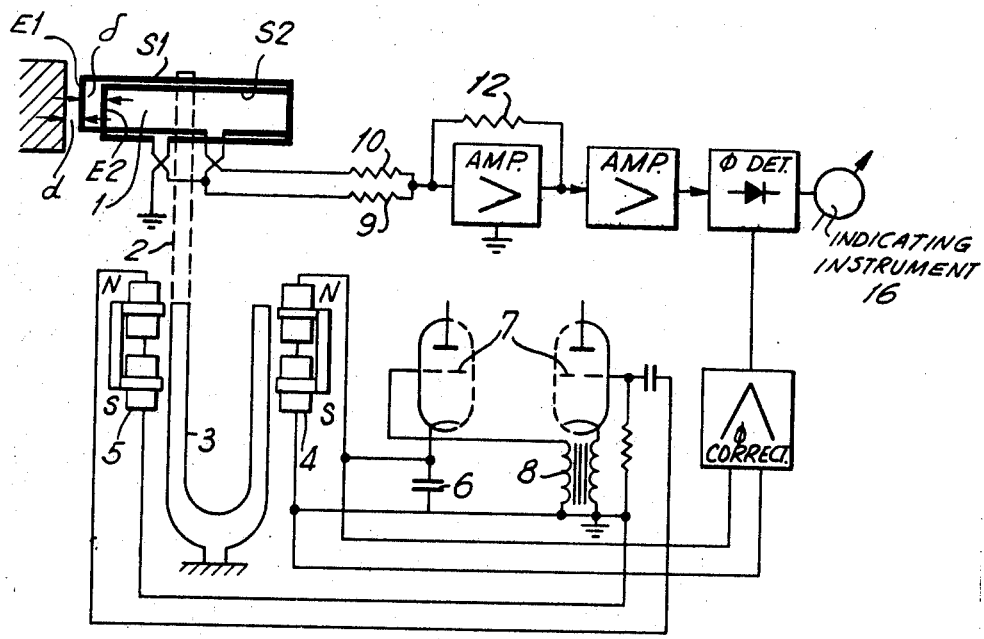
Figure 2:
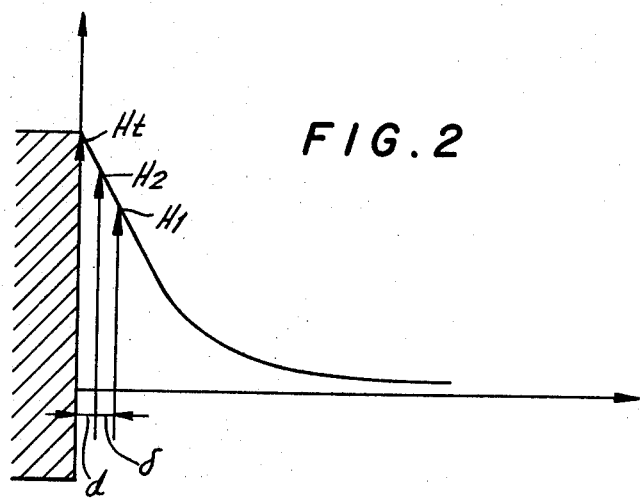

Other objects and advatages of the present invention will be disclosed in the following description of an embodiment thereof and the accompanying drawings, wherein:

FIG. 1 is a diagram of a vibrational magnetometer according to the present invention; and FIG. 2 is a diagram which shows the dependence of the tangential component of the magnetic field intensity upon the distance from the measurement point to the surface of a ferromagnetic sample.

A measuring coil 1 (FIG. 1), consisting of two sections connected in series opposition, is coupled by means of a light cantilever member 2 with a tuning-fork 3 made of a temperature-compensated mtaerial and provided with an enerigzing coil 4 and a deenergizing coil 5. The energizing coil 4, tuned by a capacitor 6 to the frequency of the natural mechanical resonance of the tuning-fork 3 together with the cantilever member 2 and the measuring coil 1, is connected to the output of an amplifier 7 made of cathode followers having a common-plate circuit with a step-up transformer 8 being used as an element of the inter-stage coupling. The deenergizing coil 5 is connected to the input of the amplifier 7.

The measuring coil 1 is connected to input resistors 9 and 10 of an operational amplifier 11 having a resistor 12 in its feedback circuit.

To the output of the operational amplifier 11 is connected an amplifier 13 with a band-pass range limited at the upper frequency by the frequency of oscillations of the tuning-fork 3 with the coil 1. Amplifier 11 thus operates at least in part as a filter.

A phase-sensitive detector 14 is connected to the output of the amplifier 13. The reference voltage is applied to the phase-sensitive detector 14 from the output of a phase-corrector 15, whose input is connected to the energizing coil 4. The output of the phase-sensitive detector 14 is provided with an indicating instrument 16 which can for instance, be a mean-value voltmeter graduated in magnetic units.

The magnetometer according to the present invention operates as follows:

On applying voltage to the amplifier 7, switched into the positive feedback circuit between the deenergizing coil 5 and the energized coil 4, the tuning-fork 3 together with the measuring coil starts to oscillate, its oscillations being undamped. Owing to the presence of the step-up transformer 8 used as an element of inter-stage coupling, the amplifier 7 provides for both power- and voltage-amplification of the signal taken off the coil 5. At the same time, the hundred-percent feedback insures a high stability of the transmission factor which, in turn, provides for the stability of the amplitude of the tuning-fork oscillations.

The tuning-fork oscillations are transmitted to the measuring coil 1 through the cantilever member 2. When the measuring coil is arranged in orthogonal position with regard to the tangential component of the magnetic field on the surface of a ferromagnetic material, an electromotive force is induced in the sections S1 and S2 of said measuring coil, the first harmonic of said electromotive force being proportional to the tangential component of the magnetic field at points located in the area of its linear diminution at distances $d$ and $d+\delta$ (FIG. 2) from the surface of the sample, where: $\delta$ is the distance between the working ends E1 and E2 of the sections of the measuring coil 1; and $d$ is the distance from the end of the outer section of the measuring coil to the surface of the sample.

The signal from the sections of the coil 1 comes to the input of the operational amplifier 11 which extrapolates the tangential component of the magnetic field on the surface of the sample:

$$H_t = H_1 + (H_2 - H_1)\frac{d+\delta}{\delta}$$

where:

$H_t$ is the tangential component of the magnetic field on the surface of the sample;

$H_1$ is the tangential component of the magnetic field at a point located at distance $d+\delta$ from the surface of the sample;

$H_2$ is the tangential component of the magnetic field at a point located at distance $d$ from the surface of the sample.

This is achieved owing to the fact that the resistances 9 and 12 are equal to one another and the relationship between the resistances 12 and 10 is equal to $$d+\delta/\delta$$

The first harmonic of the signal, proportional to the tangential component of the magnetic field on the surface of the sample, after leaving the amplifier 11 is amplified by the amplifier 13, which does not pass the second harmonic. Then the signal is rectified by the phase-sensitive detector 14 and is measured by the indicating voltmeter 16 graduated in magnetic units.

The reference voltage is supplied to the phase-sensitive detector from the output of the phase-corrector 15, whose input is connected to the energizing coil 4. The magnetic value is taken from the indicating voltmeter 16.

What is claimed is:

1. A vibration magnetometer for measuring the parameters of a magnetic field and particularly the tangential component of the magnetic field intensity on the surface of a ferromagnetic sample, comprising:

a measuring coil; a tuning-fork oscillator adapted for producing mechanical oscillations and mechanically connected to said measuring coil to make the latter vibrate and including energizing and deenergizing coils and a tuning-fork inductively coupled with said energizing and deenergizing coils, said tuning-fork oscillator having a natural frequency of oscillation, and said coil being energized by oscillation in said field; said oscillator further including an amplifier including at least two stages of cathode followers and an inter-stage coupling including a step-up transformer connecting the cathode followers, the amplifier being connected in feedback relation to said energizing and deenergizing coils; a filter tuned to the oscillation frequency of said measuring coil and connected to the latter; and an indicating means connected to said filter, the said measuring coil including two sections of different length connected in series opposition and including spaced working ends adapted for being juxtaposed to said sample at different distances from the sample.

2. A magnetometer as claimed in claim 1 further comprising a phase sensitive detector means between said filter and indication means, and a phase corrector means coupled between said energizing coil and said phase sensitive detector means and applying a reference voltage to the latter.

3. A magnetometer as claimed in claim 2 further comprising a tuning capacitor coupled in parallel with said energizing coil between said energizing coil and said amplifier.

4. A magnetometer as claimed in claim 3 wherein said filter is an amplifier having a band pass range with an upper limit corresponding to the frequency of oscillation of said tuning-fork.

5. A magnetometer as claimed in claim 4 wherein said cathode followers include a common plate circuit.

6. A magnetometer as claimed in claim 5 comprising cantilever means supporting said measuring coil on said tuning-fork.

7. A magnetometer as claimed in claim 6 wherein said filter has a band-pass characteristic to pass the first harmonic of signals derived from the measuring coil and to block the second harmonic.

References Cited

UNITED STATES PATENTS

| | | | |
|---|---|---|---|
| 1,937,583 | 12/1933 | Norrman | 331—156 |
| 2,103,224 | 12/1937 | Schweitzer et al. | 324—37 |
| 2,759,102 | 8/1956 | Burns | 331—156 |
| 2,776,404 | 1/1957 | Caldecourt | 324—47 |
| 2,956,242 | 10/1960 | Grib | 331—156 |
| 2,969,522 | 1/1961 | Crosby | 331—156 X |
| 3,089,084 | 5/1963 | Diamond et al. | 324—47 X |
| 3,116,466 | 12/1963 | Grib | 331—156 X |

FOREIGN PATENTS 1,173,412  2/1959  France.

RUDOLPH V. ROLINEC, Primary Examiner

R. J. CORCORAN, Assistant Examiner

U.S. Cl. X.R.

331—157